March 11, 1952 E. L. BAUER 2,588,795

PERPETUAL CALENDAR

Filed March 1, 1949 2 SHEETS—SHEET 1

INVENTOR.
EDWARD L. BAUER,
BY
McMorrow, Berman + Davidson
ATTORNEYS.

March 11, 1952

E. L. BAUER 2,588,795

PERPETUAL CALENDAR

Filed March 1, 1949

2 SHEETS—SHEET 2

INVENTOR.
EDWARD L. BAUER,
BY
McMorrow, Berman + Davidson
ATTORNEYS.

Patented Mar. 11, 1952

2,588,795

UNITED STATES PATENT OFFICE 2,588,795

PERPETUAL CALENDAR

Edward L. Bauer, Austin, Tex.

Application March 1, 1949, Serial No. 78,917

2 Claims. (Cl. 40—107)

This invention relates to annular calendars, and more particularly to a perpetual or cyclic calendar, including an index whereby the annual calendar for any year in the Christian Era can be selected.

It is among the objects of the invention to provide a perpetual calendar assembly of highly simplified construction including a set of annual or year calendar sheets and a simplified index whereby the proper calendar sheet for any desired year can be quickly and easily selected, wherein the year sheets carry means for quickly and easily converting them from regular year to leap year calendars, which calendar assembly is structurally simple and durable, convenient to use and store, extremely economical in construction, and which is particularly adapted for the display of advertising material thereon.

Other objects and advantages will become apparent from a consideration of the following description and the appended claims in conjunction with the accompanying drawings, wherein:

Figure 3:
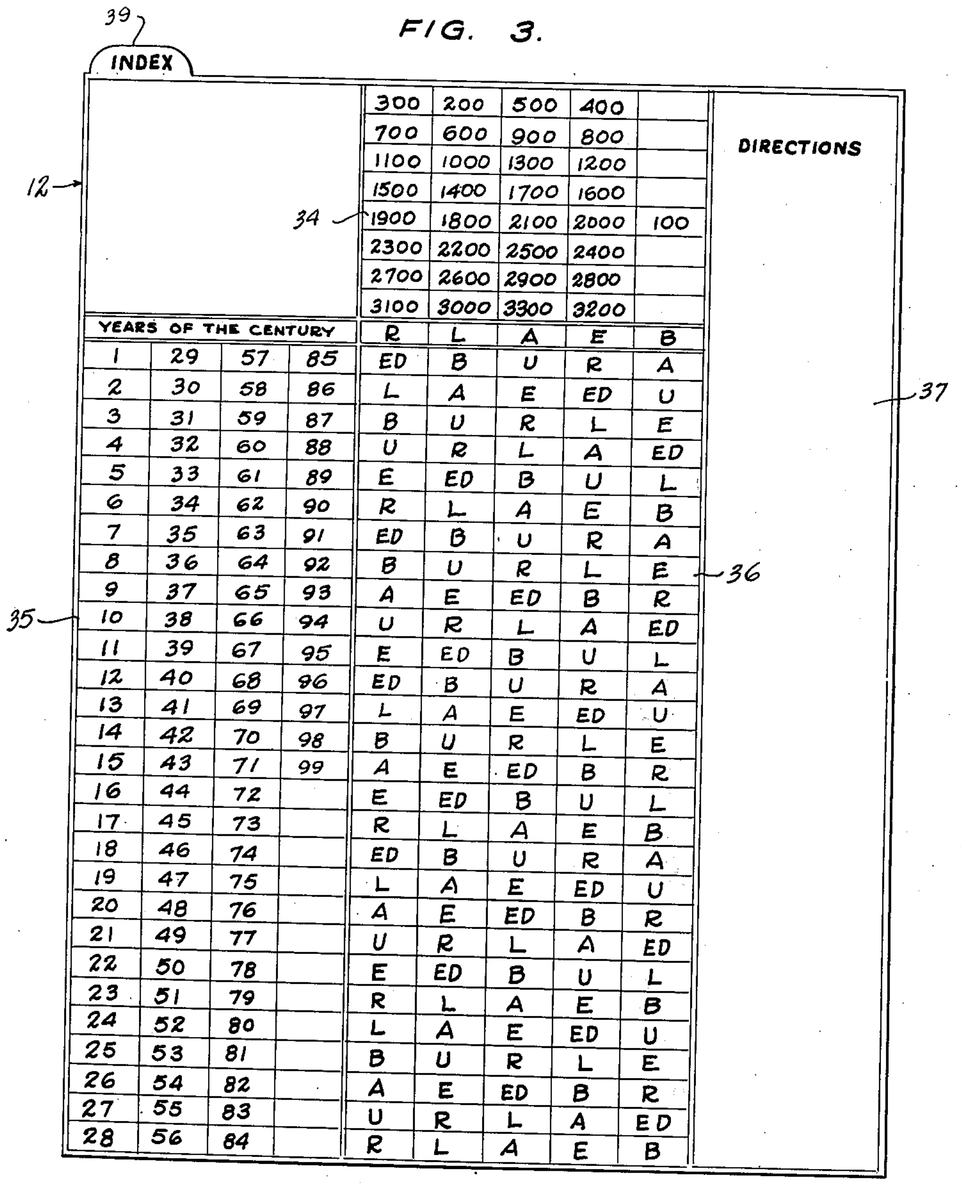
Figure 3 is a front elevation of an index sheet constituting a component of the perpetual calendar assembly.
Figure 4:
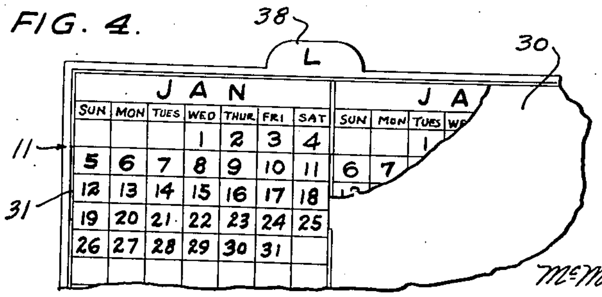
Figure 4 is a fragmentary front elevation of a year calendar sheet showing means for converting such sheet from a regular year to a leap year calendar.

With continued reference to the drawings, the perpetual calendar comprises, in general, a rectangular support 10, a set 11 of seven rectangular year calendar sheets, and a rectangular index sheet 12 of substantially the same size and shape as the year sheets, and particularly illustrated in Figure 3.

The support 10 includes a flat, rectangular back plate 13 of suitable material, such as metal, wood, paper, synthetic resin plastic, et cetera. This plate is provided near each upper corner with respective apertures 14 by means of which the support can be hung on nails or pegs to support the calendar, and is provided near its upper edge with four additional apertures 15, 16, 17 and 18 arranged in spaced-apart relationship transversely of the plate. Respective circular discs 19, 20, 21 and 22 are disposed against the back side of plate 13, or in circular recesses provided in the back side of the plate and are rotatably connected to the plate by respective connecting means, such as the pins or rivets 23, 24, 25 and 26.

The discs 19 to 22 inclusive are each provided with a circular series of numbers running from 1 through 9 to zero on the faces thereof adjacent the back side of the plate 13, and are so positioned that the numbers of these series are in alignment with the apertures 15 to 18 inclusive. The discs project a slight amount above the top edge of the plate, so that they may be easily rotated to bring desired numbers of the respective series into alignment with the corresponding apertures 15 to 18 inclusive, to provide across the top of the back plate a series of numerals indicating the year of the Christian Era for which the calendar is set.

An extension 27 of L-shaped cross-section is provided along the side edges and the bottom edge of the back plate 13 to provide, along the side and bottom edges of the support, grooves receiving the marginal portions of the year calendar sheets and the index sheet along the side and bottom edges of the latter.

The year sheets and the index sheet are shorter than the support plate 13 by an amount sufficient to expose the apertures 15 to 18 inclusive, above the upper ends of these sheets when the sheets are mounted in the grooves provided by the extension 27, and the extension preferably terminates below the top edge of the back plate 13 so that the portions of the extension along the side edges of the back plate have a length substantially equal to the length of the calendar sheets 11, and index sheet 12.

Each year calendar sheet has on its face a calendar for each of the twelve months of the year, beginning with January and ending with December. In the seven year calendar sheets of the set, the first of January occurs on successive days of the week, and the remainder of the calendar on each sheet is correlated to the day of the week on which the first day of the year occurs. As there are seven days in the week, a set of seven year calendar sheets takes care of all of the possible variations in the annual calendars of different years with the exception of leap years.

Figure 1:
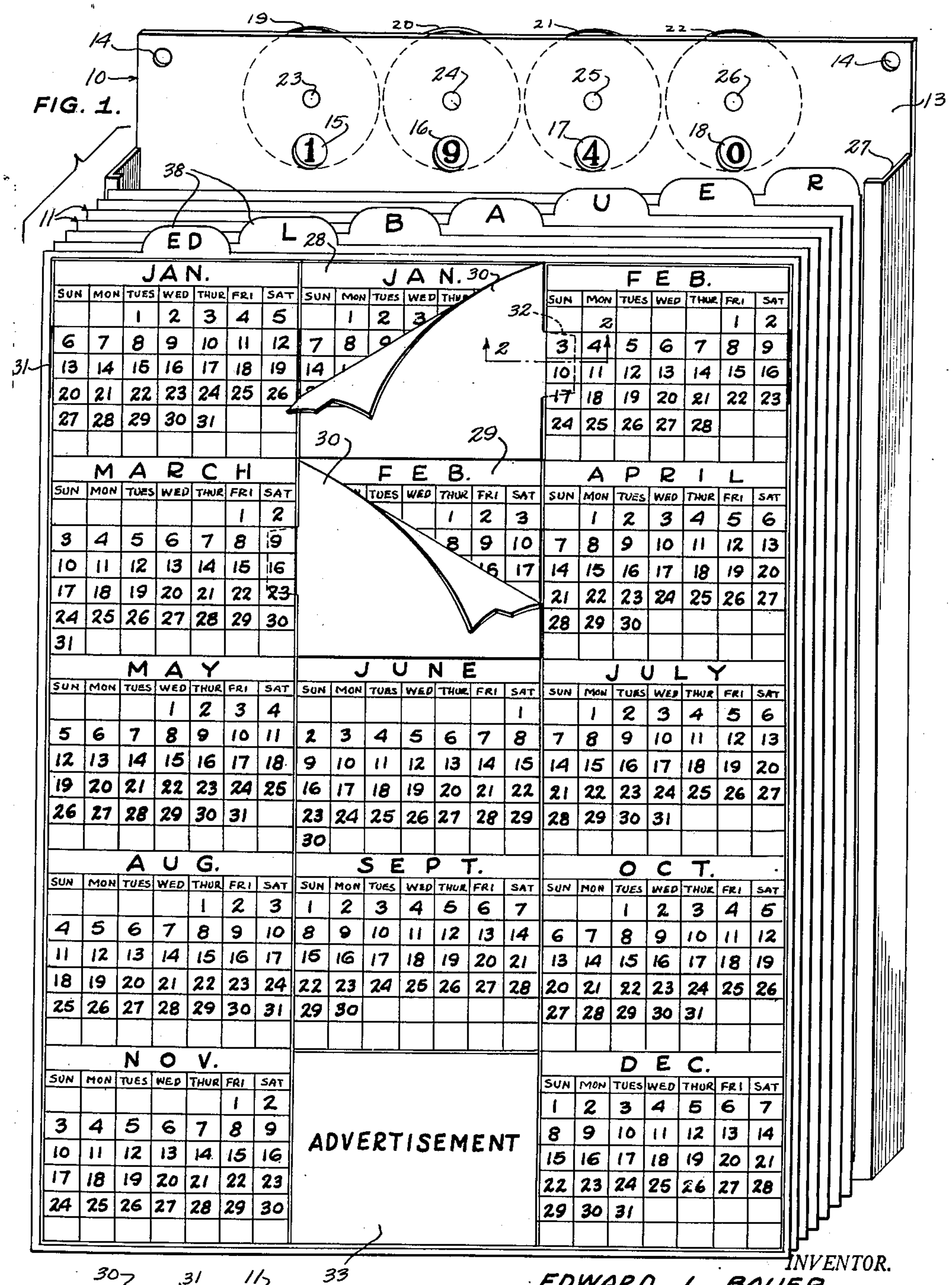
Figure 1 is a perspective, exploded view of a perpetual calendar assembly illustrative of the invention, showing one of a set of year calendar sheets in front elevation.
Figure 2:
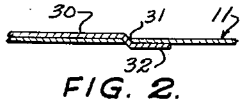
Figure 2 is a fragmentary cross-section on the line 2—2 of Figure 1.

In order to render the year calendar sheets convertible from ordinary year to leap year calendars, extra month calendars for the months of January and February are included, as indicated at 28 and 29 on Figure 1. Slots are provided in each calendar sheet, at the opposite sides of the January and February rectangles, and rectangular covers 30 of the same size and shape as the month calendar rectangles, are also provided. The slots 31 are preferably provided substantially at the mid-height locations of the month calendar rectangles, and the covers 30 are provided at their ends with tabs 32 which may be inserted through the slots at the opposite sides of a month calendar rectangle which it is desired to obscure. During a regular year, the leap year rectangles for January and February will be covered, and during a leap year the regular year rectangles for January and February will be covered, leaving the leap year rectangles exposed.

A rectangular space is left at the bottom of the center row of month calendar rectangles on each calendar sheet 11, as indicated at 33, which space may be used for displaying advertising material and, if desired, advertising material may be displayed on one or both sides of the covers 30.

The index sheet 12, as particularly illustrated in Figure 3, contains three groups or rectangles of indicia, as indicated at 34, 35 and 36, and has along one side edge a longitudinally-extending space 37 to carry directions or instructions for the use of the calendar.

The indicia rectangle 34 contains five vertical columns of eight horizontal spaces each, and in these spaces are indicated century numbers from the first century to the thirty-third century of the Christian Era, the century thirty-three-hundred being arbitrarily selected, as the calendar may be terminated at any desired century.

The rectangle 36 is disposed directly below the rectangle 34, and contains five columns which are in vertical alignment, respectively, with the five columns of the rectangle 34. The five columns in the rectangle 36 are divided into twenty-nine horizontal spaces and each of these spaces carries one of a series of seven key letters or symbols in an arrangement which will be later explained. The series of key letters or symbols may comprise the first seven letters of the alphabet, or any other series arbitrarily selected for advertising or other purposes.

The rectangle 35 is laterally aligned with rectangle 36, and contains four vertical columns divided into twenty-nine horizontal spaces which are respectively in alignment with the horizontal spaces of the rectangle 36. The spaces in the rectangle 35 contain a series of consecutive numbers from 1 through 99, representing the years of a century, these numbers beginning in the second horizontal space from the top of the rectangle 35. The top space of this rectangle is used for the even century years.

As the calendar operates on a 7-year cycle, the number of horizontal spaces in the vertical columns of rectangle 35 in an even multiple of seven, the number twenty-eight, or four-times-seven, as having been selected as providing a calendar of convenient size and shape.

With the numbers of the years of a century thus more-or-less arbitrarily set up in rectangle 35, and with the letters or symbols of the series of key letters or symbols respectively inscribed on the index tabs 38 of the calendar sheets 11, it is now possible to take a known annual calendar, find the horizontal space in rectangle 36, in lateral alignment with the space containing the year of the known calendar, select a vertical column in rectangle 36, and there inscribe the letter or symbol indicating the proper calendar sheet and to then follow this vertical column up into rectangle 34, and in one of the horizontal spaces in this vertical column of rectangle 34, inscribe the proper century. From this initial point the index may be continued both forwardly and backwardly until completed for the desired range of the calendar.

One of the letters or symbols at the top of rectangle 36 is distinguished in some manner, as by placing a circle around it or printing it in a different color from the other letters, and this letter indicates the calendar sheet corresponding to the fist year of the calendar era. Subsequent years follow consecutively in the vertical column in which this special letter is included.

The index sheet 12 also has an index tab 39 bearing the word "Index" so that the index sheet may be easily located in the support, and all of the index tabs are located at selected positions along the top edges of the index and calendar sheets, so that they may be placed in substantially non-overlapping relationship in the support, as is clearly illustrated in Figure 1.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A calendar sheet having thereon twelve regular year month calendars and two extra month calendars for January and February of leap years, the month calendars being in the form of rectangles, the month calendars for January and February of regular and leap years being formed with slots along opposite sides thereof, and two rectangular cover sheets for the last-mentioned month calendar rectangles, said cover sheets having tabs on opposite sides thereof of removably insertable in the slots of the last-mentioned calendar month rectangles to cover the leap year January and February rectangles during a leap year and to cover the regular January and February rectangles during a leap year.

2. A calendar sheet having thereon regular year month calendar rectangles for January and February and leap year month calendar rectangles for January and February, and two rectangular cover sheets for said rectangles, and means for removably and selectively securing said cover sheets over the January and February rectangles whereby the regular year January and February rectangles can be covered during a leap year and the leap year January and February rectangles exposed and the leap year January and February rectangles can be covered and the regular year January and February rectangles exposed during a regular year.

EDWARD L. BAUER.

REFERENCES CITED

The following references are of record in the file of this patent:

UNITED STATES PATENTS

| Number | Name | Date |
|---|---|---|
| 424,356 | Romaine | Mar. 25, 1890 |
| 1,219,173 | Sellers | Mar. 13, 1917 |
| 1,266,499 | Leckey | May 14, 1918 |
| 1,507,345 | Doyle | Sept. 2, 1924 |
| 1,668,280 | Maschmann | May 1, 1928 |
| 2,523,206 | Fluette | Sept. 19, 1950 |

FOREIGN PATENTS

| Number | Country | Date |
|---|---|---|
| 512,386 | Great Britain | Sept. 1, 1939 |